W. N. GROUNSELL.
ARTIFICIAL FISH BAIT.
APPLICATION FILED JUNE 2, 1921.
1,434,204.
Patented Oct. 31, 1922.
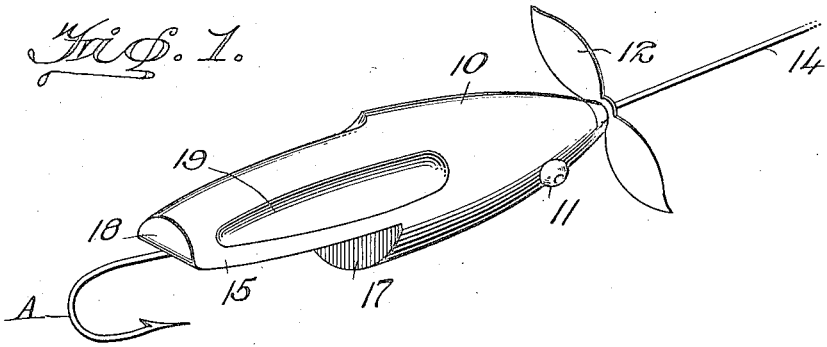
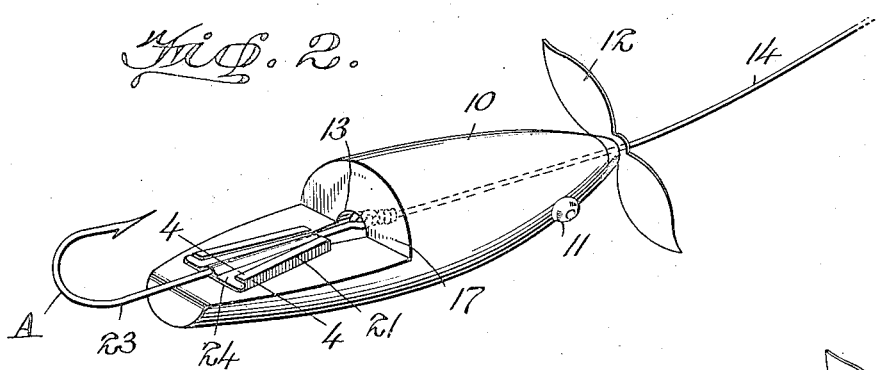
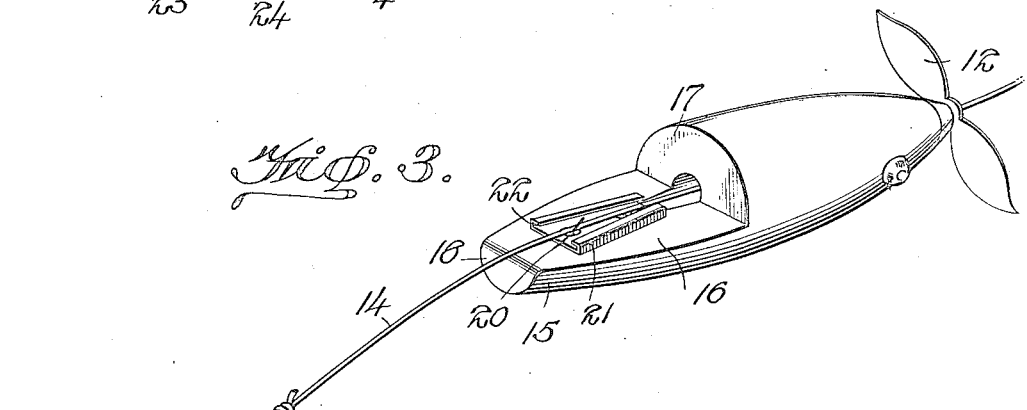
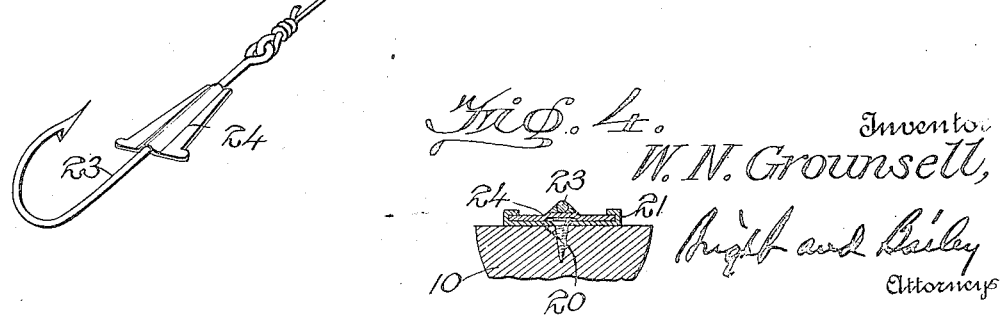

Patented Oct. 31, 1922.

1,434,204

UNITED STATES PATENT OFFICE.

WALTER N. GROUNSELL, OF SYRACUSE, NEW YORK.

ARTIFICIAL FISH BAIT.

Application filed June 2, 1921. Serial No. 474,407.

*To all whom it may concern:*

Be it known that I, WALTER N. GROUNSELL, a citizen of the United States, and resident of Syracuse, in the county of Onondaga and State of New York, have invented certain new and useful Improvements in Artificial Fish Bait, of which the following is a specification.

My invention relates to artificial fish bait and especially to the type which simulate small fish, but the basic construction employed is not limited to this specific type and may be utilized in the construction of artificial bait simulating other fish lure.

The purpose of my invention is to provide an artificial fish bait of this general character in which the simulating body, after the fish strikes and is hooked, will separate from the hook element, run a considerable distance up the line and thereby position itself at a point where its weight leverage and its resistance to free movement in the water will be of no assistance to the fish in its attempts to tear or release the hook element from its mouth.

Another purpose of my invention is to so construct the bait as to render certain the successful hooking of the fish upon the latter striking.

With the above and other purposes in view my invention consists in the details of construction and in the arrangement and combination of parts to be hereinafter more fully described and particularly pointed out in the appended claims.

In describing the invention in detail reference will be had to the accompanying drawing wherein like characters of reference denote corresponding parts in the several views, and in which—

Figure 1 is a perspective view of my invention viewed slightly from above;

Fig. 2, a similar view with the under side of the bait disposed uppermost;

Fig. 3, a view similar to Fig. 2 with the bait element detached from the body; and Fig. 4, a section on the line 4—4 of Fig. 2.

In the drawings my improved artificial bait is shown as comprising a body 10 which in this instance simulates a small fish although it may be shaped to simulate any other type of bait. This body 10 carries the usual artificial eyes 11 and has mounted on its forward end a spinner 12. A longitudinal passage 13 extends through the body and is of such diameter as to permit easy sliding of a line or leader 14 therethrough. The body 10 is provided on its underside at the rear with a cutaway portion intersecting the passage 13 and forming a reduced rear body portion or extension 15 and providing longitudinal and transverse flat faces 16 and 17 respectively. The rear end of the extension 15 is also constituted by a flat face 18. The flat faces 17 and 18 serve to present resistance surfaces to the water when the bait is drawn rearwardly therethrough for a purpose that will presently appear. Further resistance to rearward movement of the bait through the water is afforded by suitably shaped grooves 19 in the body and by the spinner 12.

Suitably secured on the face 16 in line with the passage 13 is a plate 20 having forwardly converging or tapering sides which are provided with angular portions 21 forming inwardly facing forwardly converging grooves 22. The detail construction of the plate 20 just described provides a socket member adapted to detachably receive the hook element of the bait. Such hook element is indicated at A and in this instance in shown as constituted by a single hook having a shank 23 although any of the well known hook elements and their associated lure can be utilized in carrying my invention into practice. The shank 23 is connected to the line 14 in a desirable and convenient manner and said shank is provided with a tapering enlargement 24, the taper of which corresponds to the taper or convergence of the grooves 22 whereby the enlargement can be detachably seated in said grooves from the rear and the hook element thus detachably and directly secured to the body. It will of course be apparent from the foregoing that rearward movement of the hook element relative to the body will effect its detachment therefrom and it will be also apparent that by so attaching the hook element to the body I dispose such element into close proximity to that portion of the bait game fish are known to strike initially and thereby render certain the hooking of the fish.

In the use of the bait it will be apparent that as a game fish initially strikes the bait from the rear and at a point just back of the bait head the hook element will be disposed in a position to render most certain the hooking of the fish. After the fish is hooked any direction of movement of the fish will cause backward travel of the body 10. During this travel of the body the resistance of the surfaces 17 and 18 and the grooves 19 will effect separation of the hook element and body as shown in Fig. 3 and as a result of this action the body will not, by its weight, leverage and its resistance to free movement in the water, afford any assistance to the fish in its subsequent efforts to tear the hook element from its mouth.

I claim:—

1. Artificial bait comprising a simulating body portion, a forwardly tapering plate carried by said body portion, flanges formed on the sides of said plate, and a hook element having a portion shaped to frictionally engage between said flanges whereby rearward movement of the hook element relative to the body will effect its disengagement from said plate.

2. Artificial bait comprising a simulating body, said body being cut away at its rear to provide a flat surface, a substantially flat socket member secured to said flat surface, a substantially flat member adapted for detachable connection with said socket, and a hook element carried by said member.

3. Artificial bait comprising a simulating body having a longitudinal passage formed therein, said body being cut away at its rear to provide a flat surface, a substantially flat socket member secured to said flat surface in substantial alinement with said passage, a substantially flat member adapted for detachable connection with said socket, and a hook element carried by said member.

4. Artificial bait comprising a simulating body having a longitudinal passage and a cutaway portion intersecting said passage and providing a reduced extension on the body at the rear, a forwardly tapering socket carried by said extension in substantial alinement with the passage, and a hook element having a portion shaped correspondingly to the socket and detachably seated in the latter, whereby rearward movement of the hook element relative to the body will effect its disengagement from the socket.

5. Artificial bait comprising a simulating body, a forwardly tapering plate secured to the body and having its edge portions extended angularly and inwardly to provide forwardly tapering grooves, a hook element including a shank, and an enlargement on the shank shaped correspondingly to said plate and detachably seated in said forwardly tapering grooves, whereby rearward movement of the hook element relative to the body will effect its disengagement from the plate and body.

In testimony whereof I hereunto affix my signature.

WALTER N. GROUNSELL.